July 9, 1963
N. E. COLE
3,096,996
VEHICLE FRAME STRUCTURE
Filed June 3, 1960
3 Sheets-Sheet 1
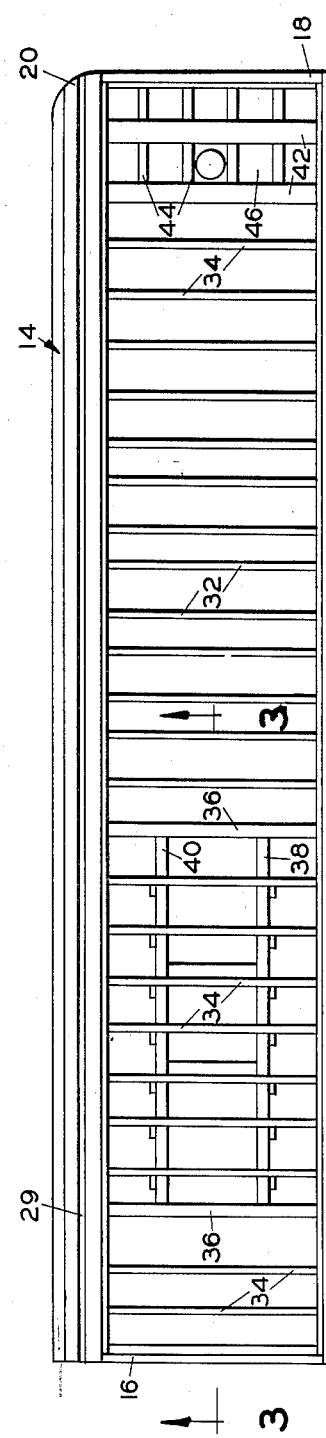
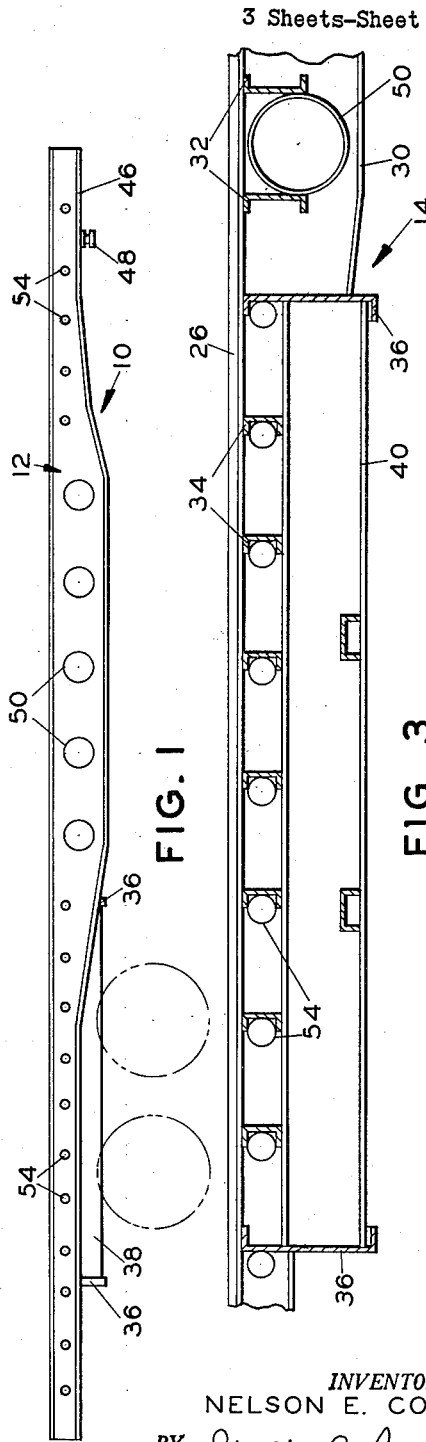
INVENTOR.
NELSON E. COLE
BY Walter E. Pavlick
ATTORNEY July 9, 1963  N. E. COLE  3,096,996
VEHICLE FRAME STRUCTURE
Filed June 3, 1960  3 Sheets-Sheet 2

INVENTOR.
NELSON E. COLE
BY *Walter E. Pavlick*

ATTORNEY

July 9, 1963  N. E. COLE  3,096,996
VEHICLE FRAME STRUCTURE
Filed June 3, 1960  3 Sheets-Sheet 3

INVENTOR.
NELSON E. COLE
BY *Walter E. Pawlick*
ATTORNEY

United States Patent Office 3,096,996
Patented July 9, 1963

3,096,996
VEHICLE FRAME STRUCTURE
Nelson E. Cole, Reading, Pa., assignor to Dana Corporation, Toledo, Ohio, a corporation of Virginia
Filed June 3, 1960, Ser. No. 33,857
3 Claims. (Cl. 280—106)

This invention relates to truck and trailer structures in general and more particularly to those used for the transportation of freight over the highways.

The primary object of this invention is to provide an improved trailer frame of strong, light-weight construction capable of withstanding larger torsional strains and carrying greater pay loads than heretofore known.

Another object is to provide an improved structure capable of supporting heavy loads and transmitting draft forces without the use of large, heavy longitudinal members.

Yet another object is to provide an improved frame structure wherein selected portions of the frame structure are used as a part of the flooring thereby greatly reducing the overall weight of the trailer structure.

Still another object is to provide a frame with transverse cross members of substantially shorter span which, therefore, are more rigid and have less weight than those heretofore used.

A further object is to provide a frame with relatively light-weight torsion resisting members which also absorb reactionary stresses from pairs of the transverse cross members.

Further objects and advantages will become apparent upon reading the following specication together with the accompanying drawings which form a part hereof.

In the drawings:

FIG. 1 is a side elevational view of a trailer constructed in accordance with the present invention.

FIG. 2 is a plan view of the trailer frame.

FIG. 3 is an enlarged partial longitudinal central section taken on line 3—3 of FIG. 2 particularly illustrating the torsion resisting members.

Figure 4:
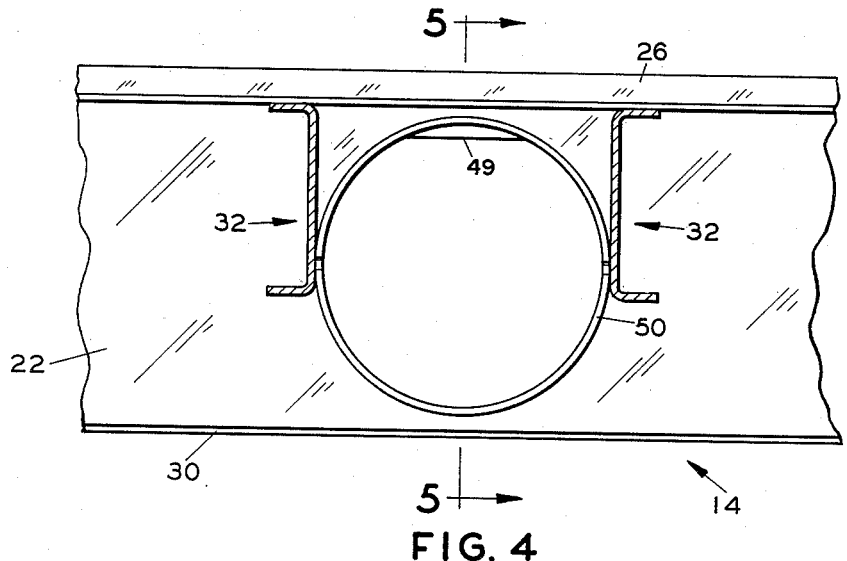
FIG. 4 is an enlarged cross sectional view illustrating the intersection of the longitudinal member and transverse beams.

One of the major problems in the construction of frames for trailers is the reduction in weight of the frame itself. Since there are generally highway load restrictions limiting the total weight that can be transported on the wheels of a vehicle, one practical way to increase the pay load, which is, of course, of primary importance in the trucking industry, is to decrease the weight of the vehicle frame.

Previously, it was the practice to construct vehicle frames of heavy structural members supported upon heavy longitudinal sills, thereby limiting the amount of pay load that could be transported. Lighter constructions have also been employed which utilize specially formed longitudinally extending, load-carrying structural members. These members are spaced apart and tied together by a series of transverse beams. This latter type of construction has not been completely satisfactory since the transverse beams are attached to the vertical web of the longitudinal members and are not capable of withstanding large torsional strains such as those caused by uneven loading, rough road ways, and shifting loads as in the case of transporting bulk liquids.

The structure, as hereinafter described, contemplates using a pair of longitudinally extending, load carrying, side girders of rectangular cross section. A series of reinforcing structural members are inset in the side girders to prevent the vertical webs of these members from buckling. The side girders are tied together by a plurality of transverse beams appropriately spaced along the length thereof. The transverse beams cooperate with the reinforcing members in such a member that reinforcing members pick up reactionary stresses from the transverse beams. These beams further serve as joists for the superficial floor of the trailer. This improved structure provides better torsional resistance and is substantially lighter than trailers previously employed.

Referring now to the drawings, a semi-trailer unit is illustrated embodying the present invention; however, it will be readily apparent that the invention may be adapted to other type vehicle frames and container or "piggyback" freight handling structures.

The trailer frame 10 constructed in accordance with the present invention includes longitudinal members or side girders 12 and 14 interconnetced at their rear ends by a transverse member 16. The transverse member 16 is attached in any suitable manner, such as welding, to the ends of the side girders 12 and 14 so as to provide a rigid connection therebetween. The forward ends of the side girders 12 and 14 are cut away to fit the ends of arcuate sections 20 which are in turn welded at their inner portions to a transverse connecting member 18.

Figure 6:
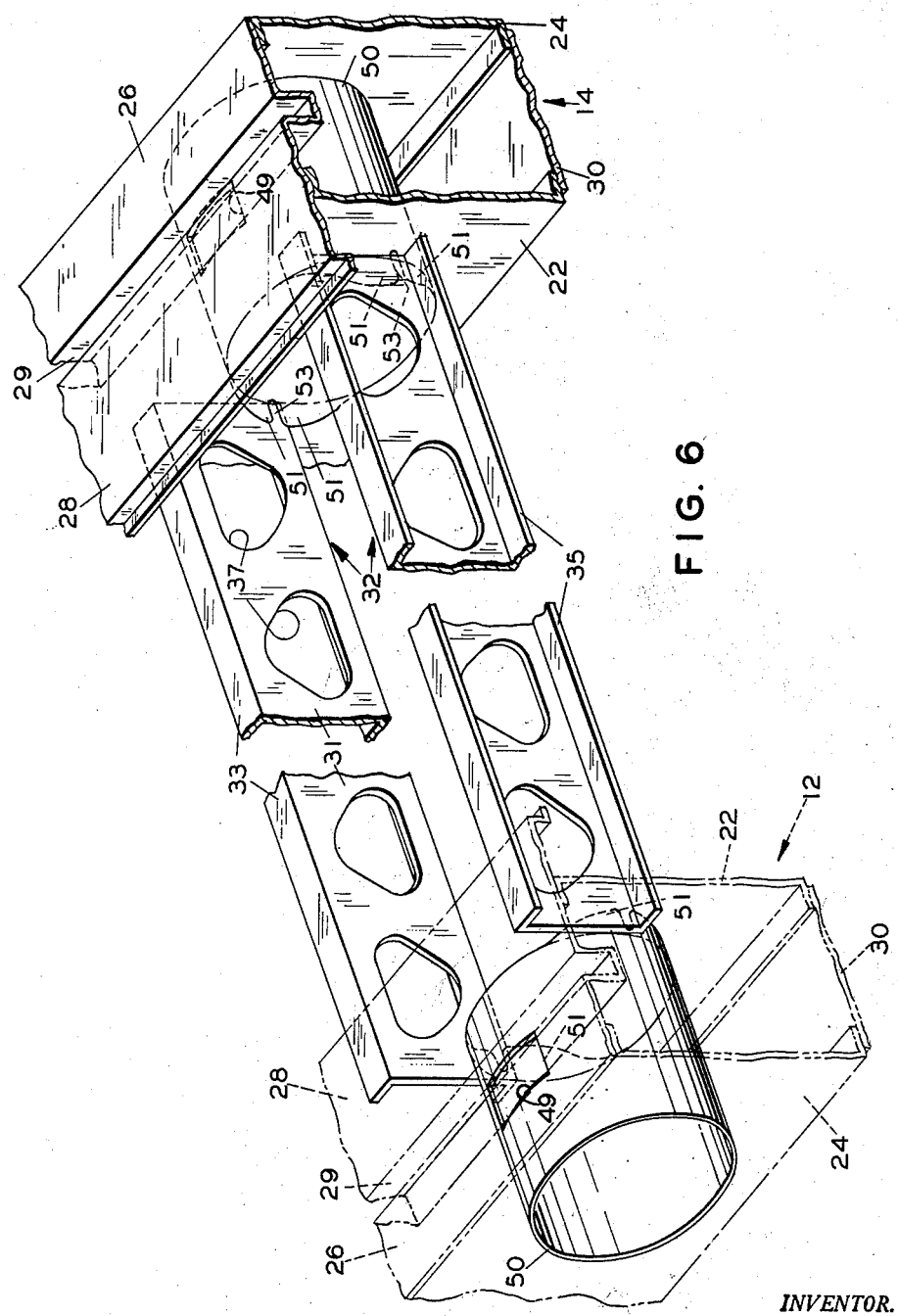
FIG. 6 is an isometric view of a section of the chassis of FIG. 1 further illustrating details of the invention.

As clearly shown in FIG. 6 the side girders 12 and 14 take the form of closed box sections composed of a pair of spaced, oppositely facing channel sections 22 and 24. The flanges of the channel sections 22 and 24 extend toward each other and the upper pair is interconnected by a light gauge plate 26 which is welded thereto. The upper plate 26 has a portion 28 formed integrally therewith which extends beyond the channel 22. Since the top plate 26 of each side girder 12 and 14 is formed of relatively light gauge material and must withstand considerable compression loads, a rib 29, in the form of an inwardly projecting longitudinally extending channel, is provided in the upper plate 26 to strengthen the same and resist buckling thereof. The box section is completed by a flat metal plate 30 which is secured to the under surfaces of the lower flanges by welding. Since the vertical web portions of the channels 22 and 24 are spaced apart, the section modulus, taken about a vertical axis of the side girders 12 and 14, is increased over that of the usual channel side members. Also, by using the spaced apart channel members with top compression and bottom tension plates, a box beam or girder can be obtained which has a high strength per weight ratio. Furthermore, the gauges of the top plate 26 and the bottom plate 30 can be varied to suit the stress requirements of any given loading condition. By this means the section modulus about the horizontal axis of the girders may be increased or decreased by merely changing the gauge of the top and bottom plates. It should be noted that this design is extremely efficient in resisting load stresses as the cross sectional areas of both the top and bottom plates are located close to the extreme outside edges of the completed girder assembly. As is apparent in FIG. 1, the medial portion of the side members 12 and 14 are substantially larger in depth than the forward and rearward portions thereof to provide increased support throughout this area.

Extending transversely at spaced intervals along the medial portion of the side rails 12 and 14 are a series of transverse floor supporting members 32 which serve to tie the side rails together. The transverse members 32 are preferably formed of light gauge sheet metal and are bent to a substantially channel shape cross section to provide vertical webs 31 and upper and lower flanges 33 and 35 respectively. The transverse members 32 are provided with a plurality of holes 37 to further reduce the weight thereof. It is obvious that the holes 37 may be provided with flanges to contribute additional stiffness of the transverse members 32 and 34 if so desired. The ends of the transverse members 32 are suitably secured by welding, for example, to the vertical web of the channels 22 of side rails 12 and 14. The upper flanges 33 of the transverse members are located at a predetermined level relative to the upper plate 26 of the side girders 12 and 14 to compensate for the thickness of flooring (not shown) which is to be placed thereon.

It should be noted that the width of the superficial flooring is decreased since the upper plate 26 and integral flange 28 of each of the side girders 12 and 14 form a part of the floor surface.

A series of reduced members 34 also extend transversely between the side girders 12 and 14 at the forward and rearward reduced portion thereof to firmly connect the same. A pair of channels 36, 36 substantially greater in depth than channels 34 extend transversely at the rearward portion of the side girders 12 and 14 and carry relatively short intermediate longitudinal members 38 and 40. This latter structure is conventional and is adapted for connection to the running gear assembly of the trailer shown in phantom lines in FIG. 1. The forward portion of the frame is also conventional and comprises transverse suspension members 42 interconnected by longitudinal braces 44 above plate 46. This structure is adapted to be mounted to the fifth wheel of the trailer pulling vehicle. A king pin 48 extends downwardly from plate 46 and is adapted for pivotal connection to the trailer pulling vehicle.

The structure thus far described is extremely light in weight but is insufficient to resist torsional strains caused by uneven road ways or shifting loads as in the case of transportation of bulk liquids. The longitudinal side members 12 and 14, therefore, are provided with a series of torsion resisting members 50 and 54 extending transversely through the box section thereof.

At the medial portion of the side girders 12 and 14 the torsion resisting members 50 take the form of relatively large cylinders made of light gauge material. The side girder channel members 22 and 24 have their webs relieved to accommodate the cylindrical members 50 which are snugly received therein and firmly attached to the webs by suitable welding. The cylindrical members 50 are provided with diametrically opposed integral extensions 51 which project through the web of channel member 22 and are adapted to engage the webs 31 of adjacent transverse members 32. The diametrically opposed projections 51 are provided with slots 53 disposed centrally therein to facilitate the welding of these extensions to the transverse members 32. It is now apparent that the reactionary or torsional stresses in the transverse members 32 are transferred to the cylindrical members 50 rather than the webs 22 and are resisted thereby.

Figure 5:
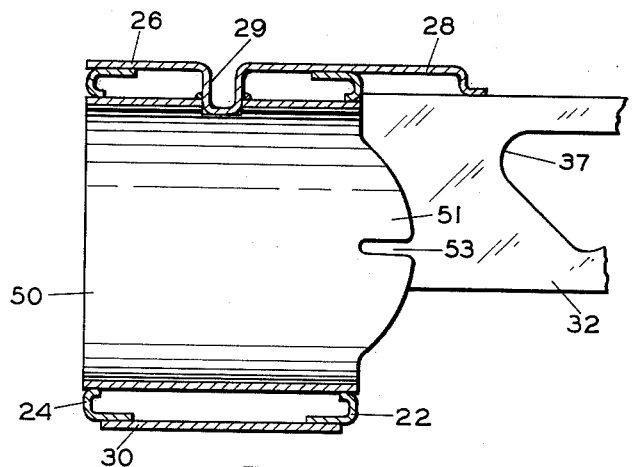
FIG. 5 is a view taken substantially along line 5—5 of FIG. 4.

Referring now to FIGS. 4, 5 and 6, it is to be noted that the rib 29 is seated in slots 49 of the torsion resisting elements 50 and is fixedly secured thereon by welds. The torsion resisting elements 50 thus serve as a support for the member 26. Furthermore, the tying of the rib 29 to the reinforcing element 50 substantially contributes to the strength and rigidity of the completed structure.

The forward and rearward portions of the side girders 12 and 14 are reinforced by a plurality of torsion resisting members 54 in the same manner as the medial portion is strengthened by the members 50. The members 54 are provided with single extensions which are separately connected each to a reduced transverse member 34 or an enlarged channel member 36 for picking up reactionary stresses between the transverse members 34 and 36 and the side girders 12 and 14.

From the foregoing description, it is apparent that a strong, light-weight structure is provided which has improved torsional resistance and is substantially lighter than trailers heretofore known.

While only a single embodiment of this invention has been shown and described, it is apparent that there may be many changes in structure and function without departing from the scope of this invention as defined by the appended claims.

I claim:

1. In a vehicle the combination comprising a longitudinal member having a box section including an upper plate member, means for reinforcing said longitudinal member, a transverse member connected to said longitudinal member and said reinforcing means externally of said longitudinal member for transmitting torsional loads to said reinforcing means, and means carried by said upper plate member for reinforcing the same and being connected to said reinforcing means whereby said reinforcing means receives loads from said upper plate member.

2. In a vehicle frame or the like the combination comprising a longitudinal member of box section including an upper plate member, a transverse member connected to said longitudinal member, a cylindrical member extending through said longitudinal member for reinforcing the same and connected to said transverse member externally of said longitudinal member to receive torsional loads therefrom, and means on said upper plate member for reinforcing the same and being connected to said cylindrical member whereby said cylindrical member receives loads from said upper plate member.

3. A frame structure comprising a pair of longitudinal girders, each of said girders being formed as a box section and comprising a pair of inwardly facing channel members, an upper plate interconnecting said channel members and extending beyond one of the same, and a lower plate further interconnecting said channel members, means forming a plurality of longitudinally spaced openings in said channel members, a plurality of cylindrical members positioned in said openings for reinforcing said channel members and extending beyond said one channel member, a rib on said upper plate for reinforcing the same and being engageable with and supported by said cylindrical member, a plurality of longitudinally spaced transverse members extending between and interconnecting said longitudinal girders, said transverse members being connected to said reinforcing members to transmit torsional loads thereto and having the ends thereof overlapped by said upper plate whereby said upper plate forms a part of the frame flooring.

References Cited in the file of this patent

UNITED STATES PATENTS

| 1,357,073 | Mooney | Oct. 26, 1920 |
| 1,593,783 | Stresau | July 27, 1926 |
| 1,704,843 | Smith | Mar. 12, 1929 |
| 2,113,403 | Harmon | Apr. 5, 1938 |
| 2,173,525 | Wallace | Sept. 19, 1939 |
| 2,194,356 | Eklund | Mar. 19, 1940 |

FOREIGN PATENTS

| 1,045,252 | Germany | Nov. 27, 1958 |